(12) United States Patent
Pradhan et al.

(10) Patent No.: US 8,200,782 B2
(45) Date of Patent: Jun. 12, 2012

(54) COMMUNICATION WITH A MOBILE DEVICE

(75) Inventors: Salil Vijaykumar Pradhan, San Jose, CA (US); Craig Peter Sayers, Menlo Park, CA (US); John Ludd Recker, Mountain View, CA (US); Alan Andrew McReynolds, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1496 days.

(21) Appl. No.: 11/118,148

(22) Filed: Apr. 29, 2005

(65) Prior Publication Data

US 2006/0245530 A1 Nov. 2, 2006

(51) Int. Cl.
*G06F 15/177* (2006.01)

(52) U.S. Cl. ........ 709/218; 709/201; 709/202; 709/203; 709/226; 709/229

(58) Field of Classification Search .................. 709/221, 709/201, 202, 203, 218, 226, 229; 455/574
See application file for complete search history.

(56) References Cited

U.S. PATENT DOCUMENTS

| | | | | | |
|---|---|---|---|---|---|
| 4,509,199 | A | * | 4/1985 | Ichihara | 455/7 |
| 4,974,192 | A | * | 11/1990 | Face et al. | 710/1 |
| 5,045,839 | A | * | 9/1991 | Ellis et al. | 340/539.11 |
| 5,436,621 | A | * | 7/1995 | Macko et al. | 340/7.54 |
| 5,802,305 | A | * | 9/1998 | McKaughan et al. | 709/227 |
| 5,870,680 | A | * | 2/1999 | Guerlin et al. | 455/557 |
| 6,154,650 | A | * | 11/2000 | Abidi et al. | 455/433 |
| 6,289,464 | B1 | * | 9/2001 | Wecker et al. | 713/300 |
| 6,298,231 | B1 | * | 10/2001 | Heinz | 455/413 |
| 6,349,204 | B1 | * | 2/2002 | Goetz et al. | 455/419 |
| 6,608,551 | B1 | * | 8/2003 | Anderson et al. | 340/10.51 |
| 6,721,288 | B1 | * | 4/2004 | King et al. | 370/310 |
| 6,795,428 | B1 | * | 9/2004 | Diachina et al. | 370/349 |
| 7,398,089 | B2 | * | 7/2008 | Gunaratnam et al. | 455/445 |
| 7,420,964 | B2 | * | 9/2008 | Narvanen et al. | 370/353 |
| 7,474,886 | B2 | * | 1/2009 | Heller | 455/343.2 |
| 2002/0098831 | A1 | * | 7/2002 | Castell et al. | 455/413 |
| 2002/0165000 | A1 | * | 11/2002 | Fok | 455/466 |
| 2003/0042316 | A1 | * | 3/2003 | Teraura | 235/487 |
| 2003/0055996 | A1 | * | 3/2003 | Mori et al. | 709/232 |
| 2003/0104848 | A1 | * | 6/2003 | Brideglall | 455/574 |
| 2004/0006630 | A1 | * | 1/2004 | Friend et al. | 709/229 |
| 2004/0110530 | A1 | * | 6/2004 | Alone et al. | 455/552.1 |
| 2004/0153539 | A1 | * | 8/2004 | Lyon et al. | 709/224 |
| 2005/0037755 | A1 | * | 2/2005 | Hind et al. | 455/435.3 |
| 2005/0160138 | A1 | * | 7/2005 | Ishidoshiro | 709/203 |
| 2006/0041687 | A1 | * | 2/2006 | Caspi et al. | 709/248 |
| 2006/0083187 | A1 | * | 4/2006 | Dekel | 370/310 |
| 2006/0116139 | A1 | * | 6/2006 | Appelman | 455/466 |
| 2006/0232437 | A1 | * | 10/2006 | Gutowski et al. | 340/825.69 |

* cited by examiner

*Primary Examiner* — Liangche A Wang

(57) ABSTRACT

An embodiment of a synchronizer for a mobile device comprises memory for containing identification data and message data. The synchronizer is operative at least part of the time when the mobile device is inactive to establish communication with a base station, to provide from memory identification data enabling the base station to establish communication between the synchronizer and a server and, where message data is waiting to be transferred between the server and the mobile device, to enable transfer of message data waiting to be transferred. The synchronizer is operative when the mobile device is active to transfer message data between the mobile device and the memory of the synchronizer.

24 Claims, 3 Drawing Sheets

COMMUNICATION WITH A MOBILE DEVICE

BACKGROUND

Mobile electronic devices such as notebook computers, personal digital assistants, cameras, media players and the like may be equipped with a wireless networking capability, so that the mobile device can connect to a network when the mobile device is within range of a base station on the network. With some computer networks, base stations may have a short range and be widely spaced, so that when the mobile device is being moved a network connection may be available only occasionally and for short periods. A mobile device may then be arranged to connect automatically with a network server whenever the mobile device finds a suitable wireless connection, to send and receive messages that have accumulated or otherwise synchronize data on the mobile device with data on the network server.

However, maintaining a mobile device such as a notebook computer in a state in which the main CPU of the notebook computer is processing instructions, so that the mobile device can detect base stations and synchronize with its server automatically, results in significant power consumption, which may drain the battery of a notebook computer undesirably. Activating the notebook computer manually when it is near a wireless base station may be impractical, if the person carrying the notebook computer merely happens to pass within range of a base station at a time when that person is not thinking of operating the computer.

SUMMARY

One embodiment of the present invention provides a synchronizer for a mobile device. The synchronizer comprises a transmitter and receiver and memory for containing identification data and message data. The synchronizer is operative when the mobile device is inactive to establish communication with a base station, to provide from memory identification data enabling the base station to establish communication between the synchronizer and a server, to determine whether message data is waiting to be transferred between the server and the mobile device, and to enable transfer of message data waiting to be transferred. The synchronizer is operative when the mobile device is active to transfer message data between the mobile device and the memory of the synchronizer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to the preferred embodiment of the present invention, example of which is illustrated in the accompanying drawings.

Figure 1:
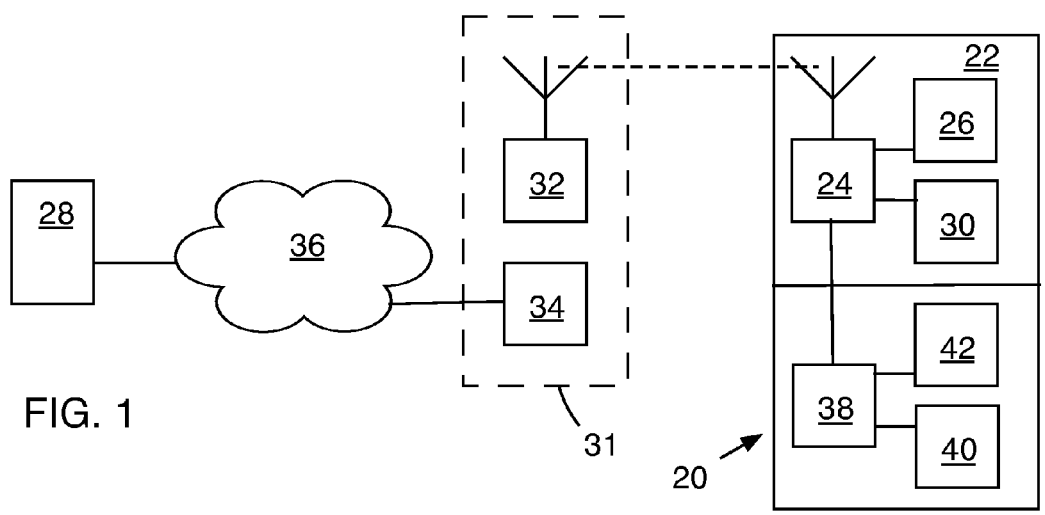
FIG. 1 is a block diagram of one form of computing system in accordance with an embodiment of the present invention.

Referring initially to FIG. 1, one embodiment of a mobile device according to an embodiment of the present invention, indicated generally by the reference numeral 20, comprises a processor 38 powered by a battery 40, and memory or other data storage 42. The mobile device 20 is provided with a synchronizer 22 including a passive transponder 24. The transponder 24 is provided with an ID memory 26 for identifying information, such as a network address of a server 28, a user-name, a password, or the like. The ID memory 26 may also contain other security settings, such as an encryption key. The transponder 24 is also provided with a data memory 30 for data to be transferred between the server 28 and the mobile device 20. The server 28 may be, for example, an e-mail server that is in continual contact with senders and recipients of e-mail over a network 36, which may be the Internet.

The mobile device 20 may be a notebook computer, and the synchronizer 22 may be in the form of an expansion card. Alternatively, the synchronizer 22 may be a device plugged into an external data port of the notebook computer. The synchronizer 22 may operate while physically separate from the notebook computer 20, and be connected to the notebook computer only when the notebook computer is active. However, for convenient operation the synchronizer 22 may be a device that is received in a device bay such as a PC card slot in the notebook computer, so that the synchronizer remains connected to the notebook computer and does not project beyond the external profile of the notebook computer.

The memories 26 and 30 are both non-volatile to the extent that they retain their contents without a power supply. However, the data memory 30 contains entries that are typically written, read once, and then discarded, whereas the ID memory 26 contains entries that are typically read many times, seldom changed, and retained for long periods. Thus, different types of memory may be used for the memories 26 and 30. Alternatively, the memories 26 and 30 may be the same type of memory, or may be parts of a single physical memory device.

A base station 31 comprises an active transmitter/receiver 32 and a processor 34. The base station processor 34 is connected by the network 36 to the server 28. The active transmitter/receiver 32 transmits both power and data. When the passive transponder 24 comes in range of the transmitter/receiver 32, power from the transmitter/receiver activates the transponder, even if the notebook computer 20 is shut down, so that power is not being supplied from the battery 40. The base station processor 34 can then read the contents of the memories 26 and 30, and can write to the memory 30. In an embodiment, the synchronizer 22 cooperates with the base station 31 in the same manner as an RFID tag. The base station processor 34 is arranged to establish a connection to the user's account on the server 28 using the information in the ID memory 26. In an embodiment, the base station processor 34 is programmed to connect to the server 28 across the network 36 using a network address for the server stored in the ID memory 26, and to log onto a user account on the server 28 using an account name, user ID, password, or similar data from the ID memory. The base station processor 34 is programmed to read from the data memory 30 and upload to the server any messages that were waiting to be uploaded, and to download from the server and write to the data memory 30 any messages that were waiting to be downloaded. In an embodiment, uploading takes place before downloading, because messages that have been uploaded can be deleted from the data memory 30, making space available for downloads. In order to limit the power consumption of the synchronizer 22, and therefore to increase the effective operating area around a base station 31, the data memory may be small. Once uploading and downloading are complete, the base station processor 34 may disconnect from the server 28.

In use of the notebook computer 20 without network access, when the notebook computer 20 is powered up, the processor 38 accesses the data memory 30 of the synchronizer. The processor 38 collects any messages that have been downloaded while the notebook computer was shut down, and deletes them from the data memory 30. When a user (not shown) of the notebook computer generates outgoing messages, completed messages are stored in the data memory 30 of the synchronizer 22. In an embodiment, the user may use an e-mail or messaging application running on the processor 38 of the notebook computer 20. The e-mail or messaging application may store messages on a hard disk 42 or other permanent storage medium of the notebook computer 20. While the notebook computer 20 is active, the synchronizer 22 is powered by the battery or other power supply 40 of the computer 20.

In an embodiment, the messages stored in the memory 30 are accompanied by descriptive data including at least a flag identifying each message as, for example, a message generated on the computer 20 and ready for upload to the server 28, or a message downloaded from the server 28 and ready for transfer to the notebook computer 20. The descriptive data may alternatively, or additionally, include a time-stamp showing when the message was stored in the data memory 30.

If the notebook computer 20 is active while the computer is in range of the base station 31, the base station may maintain a continuous link between the server 28 and the synchronizer 22, and the notebook processor 38 may maintain a continuous link to the synchronizer, so that the user has effectively a real-time link to the server 28. Alternatively, the notebook computer 20 may switch to an alternative communication system using an active transmitter on the notebook computer 20 powered by the battery 40. Alternatively, the base station 31 and the synchronizer 22 may connect at intervals, to check whether any new messages are waiting to be uploaded.

If the notebook computer 20 is in range of the base station 31, even while the computer is inactive, the base station may poll the server 28 at intervals, to check whether any new messages are waiting to be uploaded. Alternatively, the server 28 may record the fact that the notebook computer 20 is within range of the base station 31, and may alert the base station if a new message becomes available for downloading.

Figure 2:
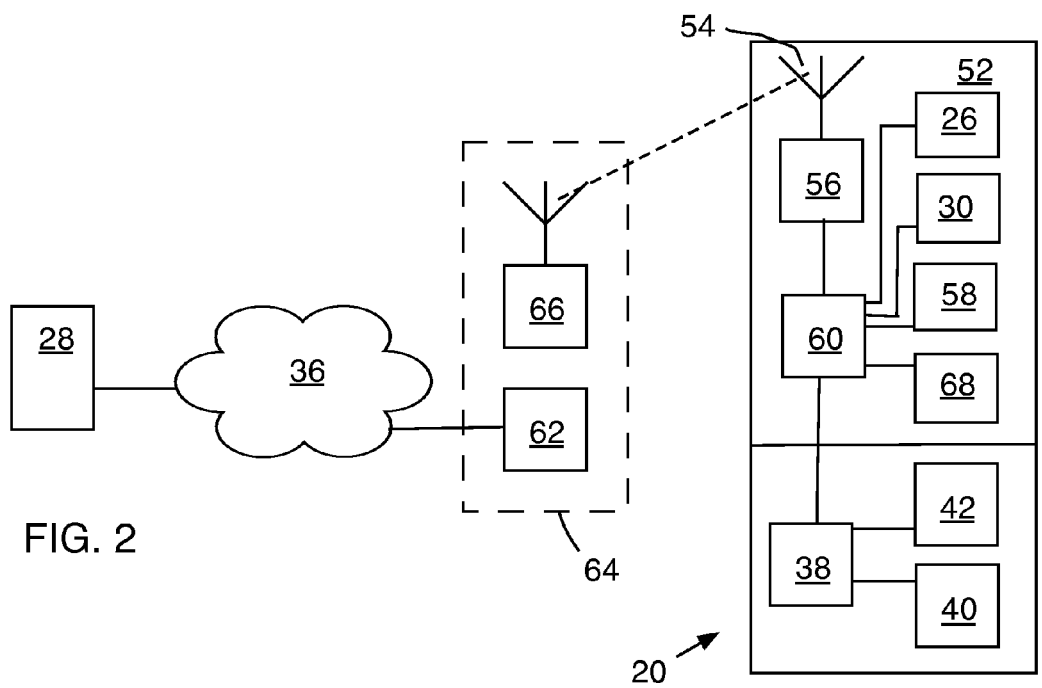
FIG. 2 is a block diagram of a second form of computing system in accordance with an embodiment of the present invention.

Referring to FIG. 2, in a notebook computer 50 according to another embodiment of the invention, a synchronizer 52 comprises an antenna 54 connected to a trigger unit 56 powered by a battery 58. The trigger unit 56 serves to detect a signal indicating the presence of a base station 64, and to activate a processor 60, also powered by the battery 58, of the synchronizer 52. The synchronizer processor 60 reads from and writes to the ID memory 26 and the data memory 30, and communicates with the processor 38 (see FIG. 1) of the notebook computer 50. The processor 38 communicates with the permanent storage medium 42. The battery 58 of the synchronizer 52 is recharged from the battery 40 of the notebook computer 50 when the notebook computer is active.

In this embodiment, a processor 62 of a base station 64 merely routes the wireless signal from the synchronizer 52 to the network 36. Handshaking and interaction between the synchronizer 52 and the server 28 are handled by the synchronizer processor 60. Because the synchronizer 52 is powered by the battery 58, a transmitter/receiver 66 of the base station 64 transmits only data, so that a larger effective operating range is practical.

To determine whether there is a base station 64 in range, the trigger 56 is powered by the battery 58. To save on battery power, the trigger 56 may be powered only intermittently. A motion detector 68 may be provided. Then, if the notebook computer 50 is stationary, and not within operating range of a base station 64, the trigger 56 may be powered only at long intervals. Occasional activation of the trigger 56 is useful in case a base station has started operating nearby, or in case the notebook computer 50 has been moved so smoothly that the motion detector 68 did not detect the movement. If the notebook computer 50 is stationary, and within range of a base station 64, there is little reason to activate the synchronizer 52 unless the notebook computer is powered up by the user, or starts to move. If the notebook computer 50 starts to move, then messages may be downloaded before the notebook computer moves out of range of the base station 64. To guard against the notebook computer 50 moving out of range of the base station 64 before the synchronizer can respond, or against the base station ceasing to operate, the synchronizer 52 may be activated to download messages from the server 28 occasionally while the notebook computer remains in range of the base station.

Although the embodiments of FIGS. 1 and 2 have been described as distinct embodiments, features from those embodiments can be combined. For example, a synchronizer with a battery 58 could be used with a base station that has a processor 34, or a synchronizer with a processor 60 could be powered inductively from a transmitter/receiver 32.

In an alternative embodiment, the memory 30 of the synchronizer 22 or 52 does not store messages, but does store at least a flag or other indication of whether the user of the notebook computer 20 or 50 has prepared messages to be uploaded that have not yet been uploaded. The memory 30 may also store other synchronization information, such as the date and time of last synchronization, a record number or timestamp for the last message downloaded, or a record number for the last synchronization event. Alternatively, the synchronizer 22 or 52 may rely on the server 28 to store the said other synchronization information. In this alternative embodiment, when the synchronizer 22, 52 establishes contact with a base station 31, 64 while the notebook computer 20, 50 is inactive, the synchronizer connects to the server 28 as described above.

If the synchronizer data memory 30 shows that the notebook computer has messages to be uploaded, the synchronizer transponder 24 or processor 60 activates the notebook computer 20 or 50. If the transaction history on the server 28, or a comparison of the most recent message on the server with the transaction history in the synchronizer memory 30, indicates that there is at least one new message to be downloaded, the synchronizer transponder 24 or processor 60 activates the notebook computer 20 or 50. Messages are then uploaded from the notebook computer processor 38 to the server 28, and/or downloaded from the server to the notebook computer processor, and the notebook computer is then powered down again. However, if there are no messages to be uploaded or downloaded, then the notebook computer 20 or 50 is not activated, and the transaction between the synchronizer 22, 52 and the server 28 is terminated.

Even if the synchronizer data memory 30 does store messages, the synchronizer may be capable of activating the notebook computer processor 38 and memory 42 when the volume of messages to be uploaded or downloaded is greater than the capacity of the data memory 30.

Figure 3:
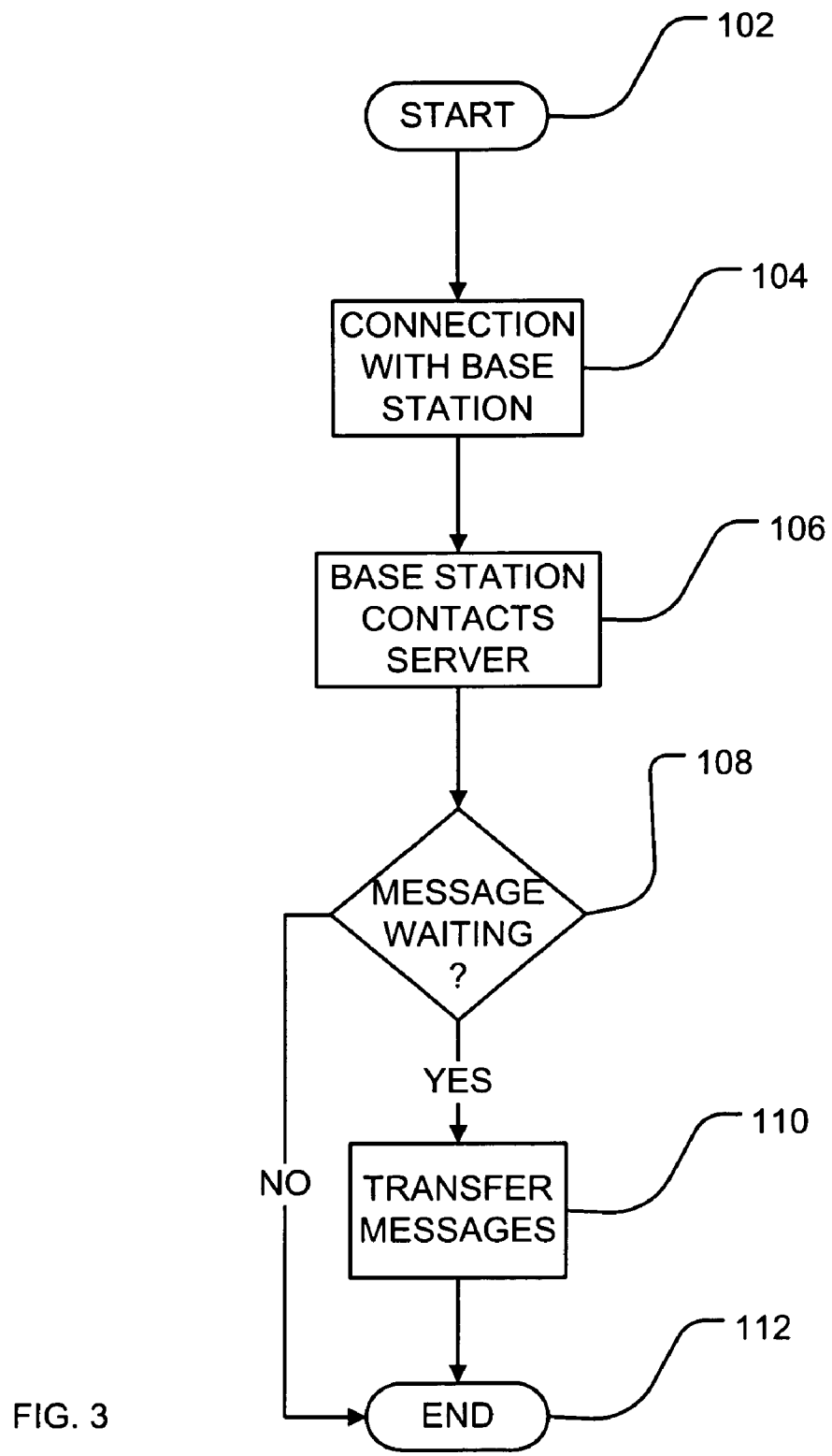
FIG. 3 is a flow chart of an embodiment of a process for handling messages in accordance with an embodiment of the present invention.

Referring now to FIG. 3, one embodiment of a method of synchronizing a mobile device with a server starts at step 102 with the synchronizer 22, 52 active. The mobile device 20, 50 may be inactive. In step 104, a connection is established between the synchronizer 22, 52 and a base station 31, 64.

In step 106, the processor 60 fetches from the identification memory 26 and sends to the base station 64, or the base station processor 34 reads from the identification memory 26, the network address of the server 28. The base station uses the network address to establish a connection over the network 36 with the server 28. The processor 34 or 60 gets a user ID, password or the like from the memory 26, and uses these to connect to an appropriate account on the server 28.

In step 108, the processor 34 or 60 and/or the server 28 determine whether there are any messages waiting to be transferred. If there are messages to be uploaded, in step 110 the messages are uploaded from the data memory 30 of the synchronizer 22, 52, and if there are messages to be downloaded, the messages are downloaded to the data memory 30 of the synchronizer 22, 52, or the mobile device 20, 50 is activated to upload from and download to the mobile device. The process then proceeds to step 112, and ends. If it is determined in step 108 that there are no messages to be transferred, the process proceeds immediately to step 112, without activating the mobile device 20, 50.

Figure 4:
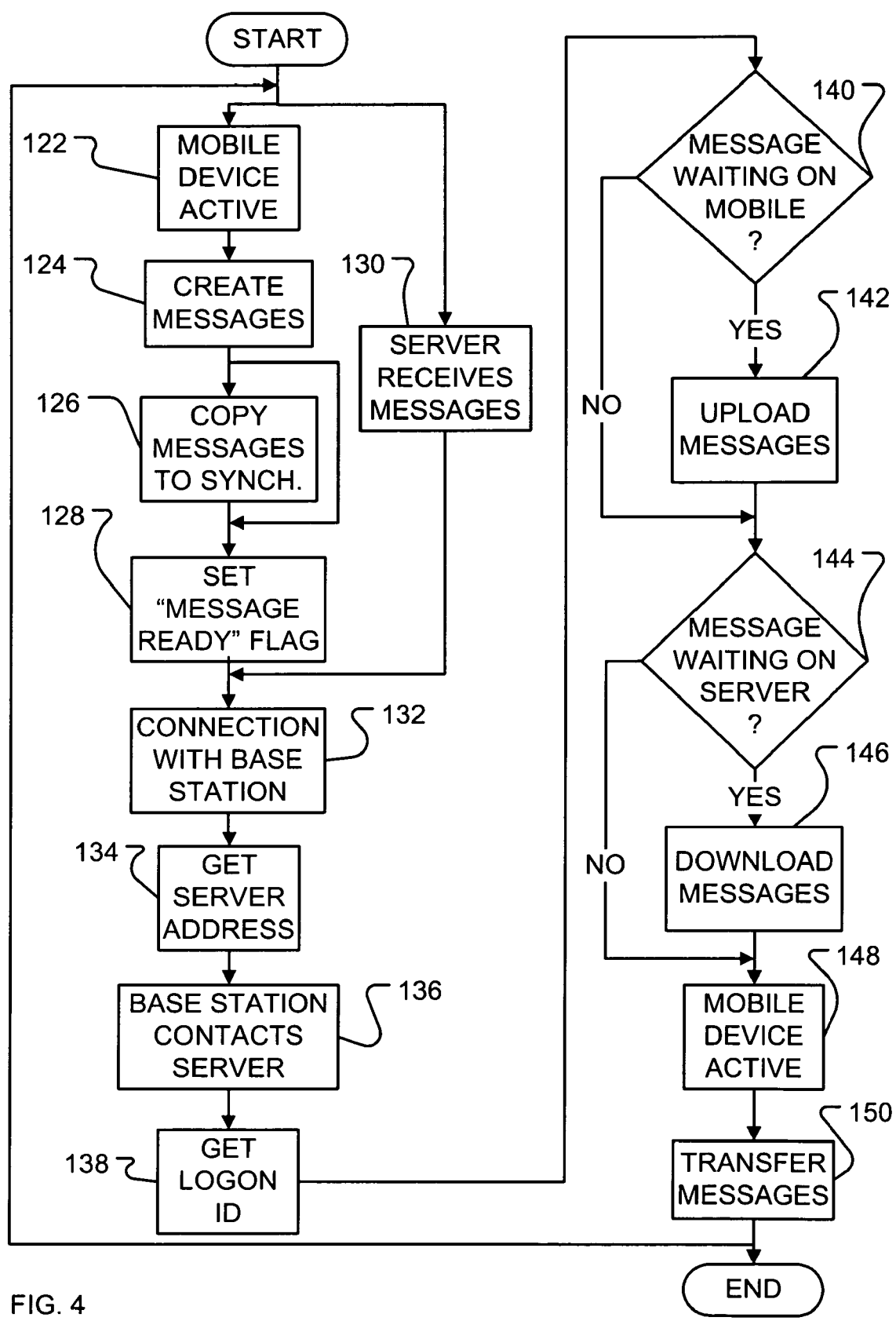
FIG. 4 is a flow chart of a further embodiment of a process for handling messages in accordance with an embodiment of the present invention.

Referring now to FIG. 4, in another embodiment of a method of synchronizing a mobile device with a server, in step 122 a mobile device 20, 50 is active, but may not be connected to a server 28. In step 124, a user may create one or more messages that are to be passed to the server 28. In step 126, the messages may be copied by the processor 38 of the mobile device 20, 50 to the data memory 30 of the synchronizer 22, 52. Alternatively, the messages may be retained in memory 42 of the mobile device 20, 50.

In step 128 the processor 38 or 60 sets a status indication that the messages are messages waiting to be uploaded. The indication may be, for example, a flag having the explicit meaning of an outgoing message ready for uploading. The indication may be, for example, a timestamp showing when the message was entered into the data memory 30. A message can be recognized as an outgoing message if its timestamp is later than last time messages were exchanged between the synchronizer 22, 52 and the server 28. Depending on the organization of the data memory 30, two or more messages may be stored as distinct entries, each with an indication of its status, or all messages queued for uploading may be stored as a single entry. If the messages are retained in memory 42 of the mobile device 20, 50 only a flag or other indication that one or more messages are ready to be uploaded may be set in the data memory 30 of the synchronizer 22, 52. If no messages were created in step 124, and any earlier messages were previously transferred, then the status indication shows that no messages are waiting to be uploaded. The mobile device 20, 50 may then be powered down, leaving only the synchronizer 22, 52 active.

While the mobile device 20, 50 is out of contact with the server 28, in step 130 the server may receive one or more messages for the mobile device or its user. Such messages are retained by the server 28.

In step 132, the mobile device 20, 50 is moved to a location where its synchronizer 22, 52 can establish contact with a base station 31, 64. In the case of a synchronizer 22 energized by the base station, the synchronizer may respond to entering the power broadcast range of the base station, similarly to an RFID device. In the case of a synchronizer 52 powered by its own battery, the synchronizer may be programmed to power up its trigger receiver 56 for a short period intermittently to listen for a nearby transmitter. The trigger 56 may be operated on a fixed schedule, or may be responsive to the motion detector 68, so that the trigger 56 looks for a base station more frequently when the mobile device 20, 50 is moving. Alternatively, the trigger 56 may be continuously active, but with only the minimum amount of circuitry powered to detect a broadcast signal from a base station 64 and respond by waking up the processor 60. Once the synchronizer 22, 52 is aware that it is within range of a base station 31, 64, the synchronizer and the base station may, for example, establish contact using an existing communication protocol.

In step 134, the processor 34 or 60 gets from the ID memory 26 the network address of the server 28, and in step 136 the base station 31, 64 connects the processor 34 or 60 with the server 28 over the network 36. The network 36 may be the internet, and the network address may then be a URL or IP address. In step 136, the processor 34 or 60 gets from the ID memory 26 the logon information, such as a username, account name, or password, for an account on the server 28, and in step 136 the processor 34 or 60 connects with the appropriate account on the server 28.

In step 140, it is determined whether there is any message from the mobile device 20, 50 waiting to be uploaded to the server 28. This determination may be made using status information in the data memory 30. For example, status flags associated with entries in the data memory 30 may be inspected, or timestamps or sequence numbers in the data memory may be compared with a record, either in the data memory 30 or on the server 28, of the last time the mobile device 20, 50 was synchronized with the server 28. In an embodiment, the server 28 and the synchronizer 22, 52 compare the sequence numbers of messages apparently waiting to be uploaded with the sequence number, stored on the server 28, of the last message successfully uploaded. Any waiting messages with higher sequence numbers are then identified as ready to be uploaded. A timestamp may be used instead of a sequence number if the mobile device 20, 50 has a reliable internal clock. The server then records the mobile device timestamp for the latest message successfully uploaded, so a discrepancy between the mobile device clock and the server clock does not affect the process.

If the actual messages are not in the data memory 30, then the data memory contains an entry, set in step 128, indicating that messages to be uploaded are waiting in the memory 42. In response to that indication, the processor 60 of the synchronizer 52 activates the portable device 50 in order to access the memory 42.

In step 142, the waiting messages are uploaded from the synchronizer 22, 52 to the server 28. In an embodiment, the messages are uploaded in sequence number order. The server then records the timestamp or sequence ID of the last message, or the last message successfully uploaded, and uses this information to start uploading when the connection is next established. If the uploading is interrupted before all messages are successfully uploaded, the uploading may be able to resume without duplicating or missing messages. In an embodiment, messages are sorted into categories by urgency or importance, and the most urgent or important messages are sent first. Each category of message may then have a separate series of sequence numbers, or the server may record the last uploaded sequence ID or timestamp separately for each category.

The memory space occupied by the uploaded messages in the data memory 30 is released, and any status indications are updated. In an embodiment, updating the status indication comprises changing a record of the time of last synchronization stored in the data memory 30 to the latest timestamp or sequence ID associated with the messages that have just been uploaded. In an embodiment, a status flag is changed from a status indicating a message waiting to be uploaded to a status indicating a message that has been successfully uploaded, or merely indicating memory free for reuse. In an embodiment where not all messages may be uploaded, for example, where a connection between the synchronizer 22, 52 and the base station 31, 64 may last for only a short period, a status indication for each message may be updated individually. If it is determined in step 140 that no messages are waiting to be uploaded, the process may skip step 142.

In step 144, it is determined whether there is any message on the server 28 waiting to be downloaded to the mobile device 20, 50. This determination may be made using status information stored in the server 28 or in the synchronizer similar to the status information described with reference to step 128 above. Where a server 28 serves a large number of mobile devices 20, 50, the administrative load on the server may be limited by the server applying a timestamp to each message according to the server clock, and each synchronizer 22, 52 recording the server timestamp of the last message successfully downloaded. If the data memory 30 does not store the downloaded messages, and the portable device 50 was not activated in step 140, the processor 60 of the synchronizer 52 activates the portable device in order to access the memory 42 if there are messages waiting to be downloaded.

In step 146, the waiting messages are downloaded from the server 28 to the synchronizer 22, 52. The downloaded messages may be stored into memory space in the data memory 30 released by the uploaded messages. Thus, uploading messages from the synchronizer 22, 52 before downloading messages to the synchronizer reduces the amount of data memory 30 on the synchronizer for any given message capacity. Any status indications are updated to identify the messages as messages that have been downloaded from the server 28 to the synchronizer 22, 52, and not yet transferred from the synchronizer to the memory 42 of the portable device 20, 50. In an embodiment, updating the status indication comprises associating with the messages that have just been downloaded a timestamp indicating the time of downloading. The server 28 maintains a separate record of which messages have been downloaded from the server to the synchronizer 22, 52. If not all of the waiting messages are successfully downloaded, for example, because the data memory 30 becomes full, or because the connection between the synchronizer 22, 52 and the base station 31, 64 is lost, then the server 28 may attempt to download the remaining messages next time a connection is established. A record of the time of last synchronization according to the server clock may now be updated. If it is determined in step 144 that no messages are waiting to be downloaded, the process may skip step 146.

If the portable device 20, 50 was activated in step 140 or 144, then it may be powered down as soon as step 146 is completed.

At some later time, in step 148, the user activates the mobile device 20, 50. At that time, the processor 38 inspects the data memory 30, and determines whether there has been a synchronization with the server 28 since the mobile device was last active. This may be determined, for example, by inspecting status flags and finding that messages previously waiting to be uploaded have been uploaded, or have been replaced by downloaded messages, or by inspecting timestamps or sequence IDs and finding that there has been activity since the last time that the mobile device 20, 50 was active. When there has been a synchronization, in step 150 the processor 38 of the mobile device retrieves any downloaded messages from the data memory 30 to the memory 42, and updates any status indications in the data memory 30 to show that the memory space is available for new messages waiting to be uploaded. Where the messages were saved directly to the memory 42 in step 146, step 150 may have been carried out as part of step 146, and a distinct step 150 may be omitted. The process then ends, or loops back to step 122.

In an alternative form of the method described with reference to FIG. 4, where the base station 31 has a processor 34 that is responsible for communication with the server 28, in step 134 the entire contents of the memories 26 and 30 may be uploaded to the base station 31. The process then proceeds using the uploaded copy of the memories 26 and 30. In step 146, the memory 30 is then updated in a single transaction, canceling the uploaded messages and writing the messages newly downloaded from the server 28. In this alternative, step 146 finishes with the base station processor 34 confirming to the server 28 that the write to the memory 30 has been completed. If that confirmation is not received, it is prudent for the server 28 to assume that the write was not successful, and to present the same messages for downloading at the next synchronization. This alternative form is appropriate where the synchronizer 22 has little or no processing power, because the synchronizer is involved only in the very simple functions of reading or writing an entire memory.

In an alternative form of the method described with reference to FIG. 4, where the data memory 30 does not store the messages, both of steps 140 and 144 may be carried out before either of steps 142 and 146. Then, it is first determined in steps 140 and 144 whether it is necessary to activate the computer processor 38. If so, the processor 38 may be active for the minimum period of time in steps 142 and 146 while messages are transferred from and to the computer.

It will be apparent to those skilled in the art that various modifications and variations can be made in the present invention without departing from the spirit or scope of the invention. For example, although certain embodiments have been described as powered by a battery 58 in the synchronizer, the synchronizer could instead be powered by the battery 40 of the notebook computer if the construction of the notebook computer allows the battery to power auxiliary devices while the notebook computer is shut down. Although the synchronizer battery 58 has been described as powered by the notebook battery 40, depending on the relative sizes of and loads on the two batteries, the batteries could instead be isolated, with the synchronizer battery 58, like the notebook battery 40, being recharged only when the notebook computer is connected to an external power source.

Embodiments have been described in which the communication between the base station and the synchronizer is wireless communication. Radio frequency communication allows a reasonable operating range. From 1 second to a few seconds may be required for the synchronizer 22, 52 to connect to the server 28 and upload and download messages. An embodiment in which the exchange can be completed while a person carrying the mobile device 50 is walking past a base station 64 thus requires an operating range of a few meters round a base station. Infra-red communication is also possible for data transfer, and in the case of a base station 31 and synchronizer 22 may be combined with electromagnetic or electrostatic power transfer. In an alternative embodiment, a connection may be established by placing the synchronizer 22, 52 in mechanical and electrical contact with a base station.

Although embodiments have been described in which the mobile device 20, 50 is a notebook computer, the mobile device may be any device capable of generating and/or storing messages to be uploaded to a server and/or capable of downloading messages waiting on a server. The term "messages" is not restricted to communications to or from a human being, but includes any data packaged for uploading or downloading.

Although, in the interests of simplicity, embodiments have been described with only one mobile device, one base station, and one server, there may in practice be numerous mobile devices and numerous base stations. There may be numerous servers, or a system may use a single server. Base stations, especially base stations 64 that merely provide a connection from a wireless signal to a publicly accessible network 36, may be provided independently of the servers 28 and synchronizers 52.

Thus, it is intended that the present invention cover the modifications and variations of this invention provided they come within the scope of the appended claims and their equivalents.

What is claimed is:

1. A method of synchronizing a mobile device with a server, comprising:
    establishing a connection between a base station and a synchronizer, the synchronizer being capable of operating independently of the mobile device without power being supplied by the mobile device when the mobile device is shut down;
    establishing communication, through the base station, between the server and the synchronizer, when the mobile device is shut down, using address information stored on the synchronizer;
    determining from information stored in the synchronizer whether first messages from the synchronizer are waiting to be uploaded to the server, and when first messages from the synchronizer are waiting to be uploaded to the server, uploading the first messages from the synchronizer to the server;
    determining from information stored in the server whether second messages are waiting on the server to be downloaded to the mobile device, and when second messages are waiting on the server to be downloaded to the mobile device, downloading the second messages from the server to the synchronizer when the mobile device is shut down; and
    transferring message data between the mobile device and the synchronizer when the mobile device is not shut down.

2. A method according to claim 1, wherein establishing a connection comprises supplying power to the synchronizer from the base station.

3. A method according to claim 1, wherein establishing a connection comprises at least one of the base station and the synchronizer monitoring for and detecting the presence of the other of the base station and the synchronizer within a range of wireless communication.

4. A method according to claim 1, wherein establishing communication between the server and the synchronizer comprises the base station contacting the server over a network using the address information stored on the synchronizer.

5. A method according to claim 1, wherein establishing communication between the server and the synchronizer comprises connecting to the server using identification information stored on the synchronizer.

6. A method according to claim 1, wherein uploading the first messages and downloading the second messages are performed without activating the mobile device.

7. A method according to claim 1 additionally comprising:
    generating messages using the mobile device and storing the messages in the synchronizer to be uploaded.

8. A method according to claim 1 additionally comprising:
    activating the mobile device and transferring downloaded messages from the synchronizer to the mobile device.

9. A method according to claim 1, wherein uploading the first messages and downloading the second messages are performed by activating the mobile device when uploading the first messages from a memory in the mobile device and when downloading the second messages to the memory in the mobile device.

10. A system for synchronizing a mobile device with a server, comprising:
    a base station capable of communicating with the server;
    a synchronizer, operable independent of the mobile device without power being supplied by the mobile device, that connects with the base station, wherein the synchronizer includes memory that stores identification data and message data; and
    a processor, on the base station or on the synchronizer, arranged to establish communication, through the base station, between the server and the synchronizer, that uses the identification data to determine from information stored in the synchronizer whether first messages from the mobile device are waiting to be uploaded to the server and when first messages from the mobile device are waiting to be uploaded to the server to cause uploading of the first messages, and that determines whether second messages are waiting on the server to be downloaded to the mobile device and when second messages are waiting on the server to be downloaded to the mobile device causes downloading of the second messages;
    wherein the synchronizer transfers message data between the mobile device and the memory of the synchronizer when the mobile device is not shut down.

11. A system according to claim 10, wherein the base station is arranged to transmit power to the synchronizer.

12. A system according to claim 10, wherein the synchronizer comprises data memory and the synchronizer is arranged to upload messages from the data memory or download messages to the data memory without activating the mobile device, and to transfer messages from or to the mobile device when the mobile device is active.

13. A system according to claim 10, wherein the synchronizer is arranged to activate the mobile device when messages are waiting to be uploaded or downloaded and to permit uploading of messages from a memory in the mobile device or downloading of messages to the memory in the mobile device.

14. A synchronizer for a mobile device, comprising:
    transmitting and receiving means for establishing connection and communicating with a base station independently of the mobile device when the mobile device is shut down, without power being supplied by the mobile device;
    means for storing identification data and message data;
    means for providing the identification data from the means for storing to the base station so that the base station can use the identification data to establish communication between the synchronizer and a server;

means for enabling transfer of message data between the server and the synchronizer through the base station;

means for determining from information stored in the synchronizer or information stored in the server whether message data is waiting to be transferred between the mobile device and the server; and means for transferring message data between the mobile device and the means for storing.

15. A synchronizer according to claim 14, means for transferring transfers messages between the mobile device and the memory when the mobile device is active and connected to the synchronizer.

16. A synchronizer according to claim 14, wherein the means for enabling activates the mobile device when the synchronizer is in communication with a server and one of the mobile device and the server has a message waiting to be transferred.

17. A synchronizer for a mobile device, comprising:

memory for containing identification data and message data;

wherein the synchronizer, without power being supplied by the mobile device, establishes communication with a base station when the mobile device is shut down, the synchronizer providing the identification data to the base station, the base station using the identification data to establish a connection between the synchronizer and a server, through the base station, so that when the synchronizer determines the message data is waiting to be uploaded to the server, the message data can be sent from the synchronizer through the base station to the server and, when the server determines new message data is waiting on the server to be downloaded, the new message data can be sent from the server through the base station to the mobile device; and wherein the synchronizer transfers the message data between the mobile device and the memory of the synchronizer when the mobile device is not shut down.

18. A synchronizer according to claim 17, further comprising a processor that controls transfer of data between the memory and the base station and controls transfer of data via the base station between the memory and the server.

19. A synchronizer according to claim 17, wherein the synchronizer comprises a processor that detects the base station.

20. A synchronizer according to claim 17, further comprising a motion sensor arranged to inhibit sensing for the presence of a base station when the synchronizer is not moved.

21. A synchronizer according to claim 17, wherein the memory is readable and writable by a processor of the base station.

22. A synchronizer according to claim 17, wherein the synchronizer is powered by the base station.

23. A synchronizer according to claim 17, wherein the message data comprises messages, and wherein the synchronizer transfers messages between the server and the memory when the mobile device is inactive, and transfers messages between the mobile device and the memory when the mobile device is active.

24. A synchronizer according to claim 17, wherein the message data in the memory comprises an indication of whether or not the mobile device has a message waiting to be transferred, and wherein the synchronizer is activates the mobile device when the synchronizer is in communication with the server and one of the mobile device and the server has a message waiting to be transferred.

* * * * *

UNITED STATES PATENT AND TRADEMARK OFFICE
CERTIFICATE OF CORRECTION

| | |
|---|---|
| PATENT NO. | : 8,200,782 B2 |
| APPLICATION NO. | : 11/118148 |
| DATED | : June 12, 2012 |
| INVENTOR(S) | : Salil Vijaykumar Pradhan et al. |

It is certified that error appears in the above-identified patent and that said Letters Patent is hereby corrected as shown below:

In column 12, line 28, in Claim 24, after "synchronizer" delete "is".

Signed and Sealed this
Eighteenth Day of December, 2012

David J. Kappos
*Director of the United States Patent and Trademark Office*